(12) United States Patent
Zanetti

(10) Patent No.: US 12,077,367 B2
(45) Date of Patent: Sep. 3, 2024

(54) DRUM FOR WELDING WIRE

(71) Applicant: SPAZZOLPLASTICA S.R.L., San Zenone degli Ezzelini (IT)

(72) Inventor: Paolo Zanetti, San Zenone degli Ezzelini (IT)

(73) Assignee: SPAZZOLPLASTICA S.R.L., San Zenone Degli Ezzelini (IT)

( * ) Notice: Subject to any disclaimer, the term of this patent is extended or adjusted under 35 U.S.C. 154(b) by 220 days.

(21) Appl. No.: 17/636,036

(22) PCT Filed: Jul. 27, 2020

(86) PCT No.: PCT/IB2020/057060
§ 371 (c)(1),
(2) Date: Feb. 17, 2022

(87) PCT Pub. No.: WO2021/044229
PCT Pub. Date: Mar. 11, 2021

(65) Prior Publication Data
US 2022/0281676 A1 Sep. 8, 2022

(30) Foreign Application Priority Data
Sep. 6, 2019 (IT) .................... 102019000015737

(51) Int. Cl.
*B65D 85/04* (2006.01)
*B23K 9/133* (2006.01)
*B65D 25/10* (2006.01)
*B65D 25/22* (2006.01)
*B65H 75/16* (2006.01)

(52) U.S. Cl.
CPC ............. *B65D 85/04* (2013.01); *B23K 9/133* (2013.01); *B65D 25/108* (2013.01); *B65D 25/22* (2013.01); *B65H 75/16* (2013.01); *B65H 2701/36* (2013.01)

(58) Field of Classification Search
CPC .. B65D 85/04; B65D 25/108; B65H 75/4402; B65H 2710/36; B65H 49/08; B65H 57/18; B65H 2701/36; B65H 75/16; B23K 9/133
See application file for complete search history.

(56) References Cited

FOREIGN PATENT DOCUMENTS

| EP | 1616814 A1 | 1/2006 | |
| EP | 2634113 A1 * | 9/2013 | ........... B23K 9/1333 |
| EP | 2634113 A1 | 9/2013 | |
| FR | 2882039 A1 | 8/2006 | |

* cited by examiner

*Primary Examiner* — Anthony D Stashick
*Assistant Examiner* — L Kmet
(74) *Attorney, Agent, or Firm* — Rivka Friedman

(57) ABSTRACT

A drum is described for containing a coil of welding wire, comprising a container having a bottom and side walls for delimiting a cavity in which the coil can be housed, and a lid to close the container,
To improve the storage the container is a frustoconical shell and the base of the container corresponds to the bottom of the container.

17 Claims, 5 Drawing Sheets

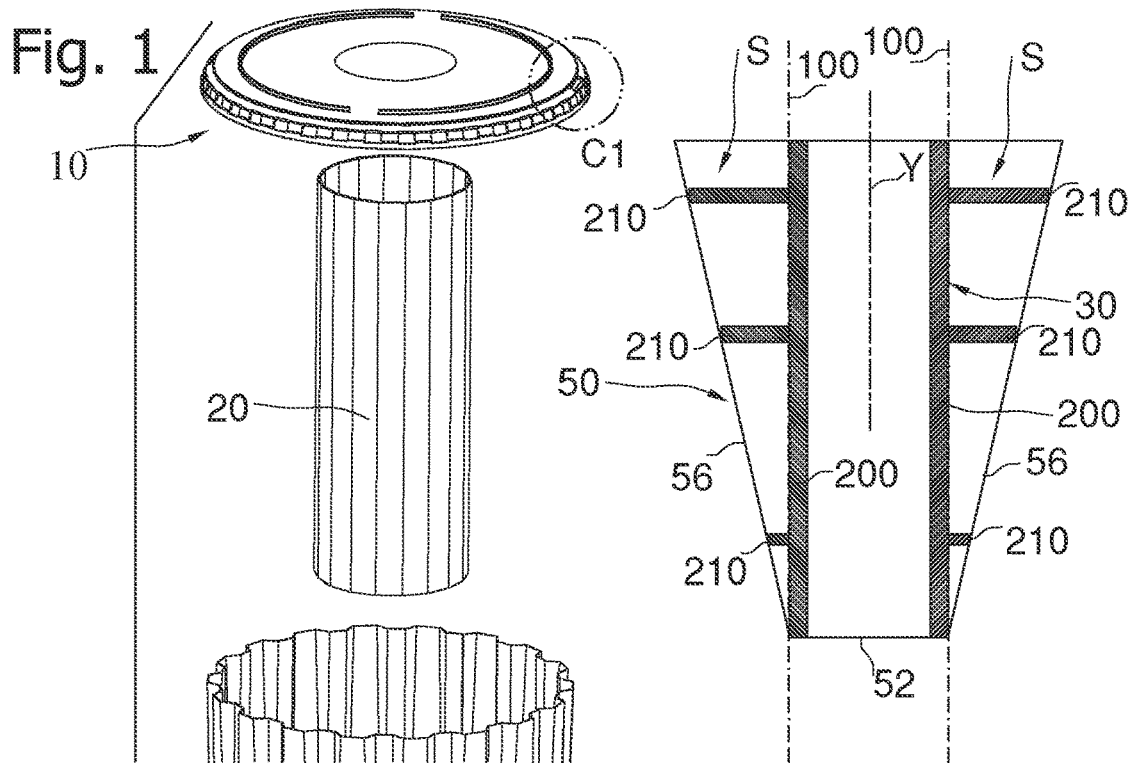
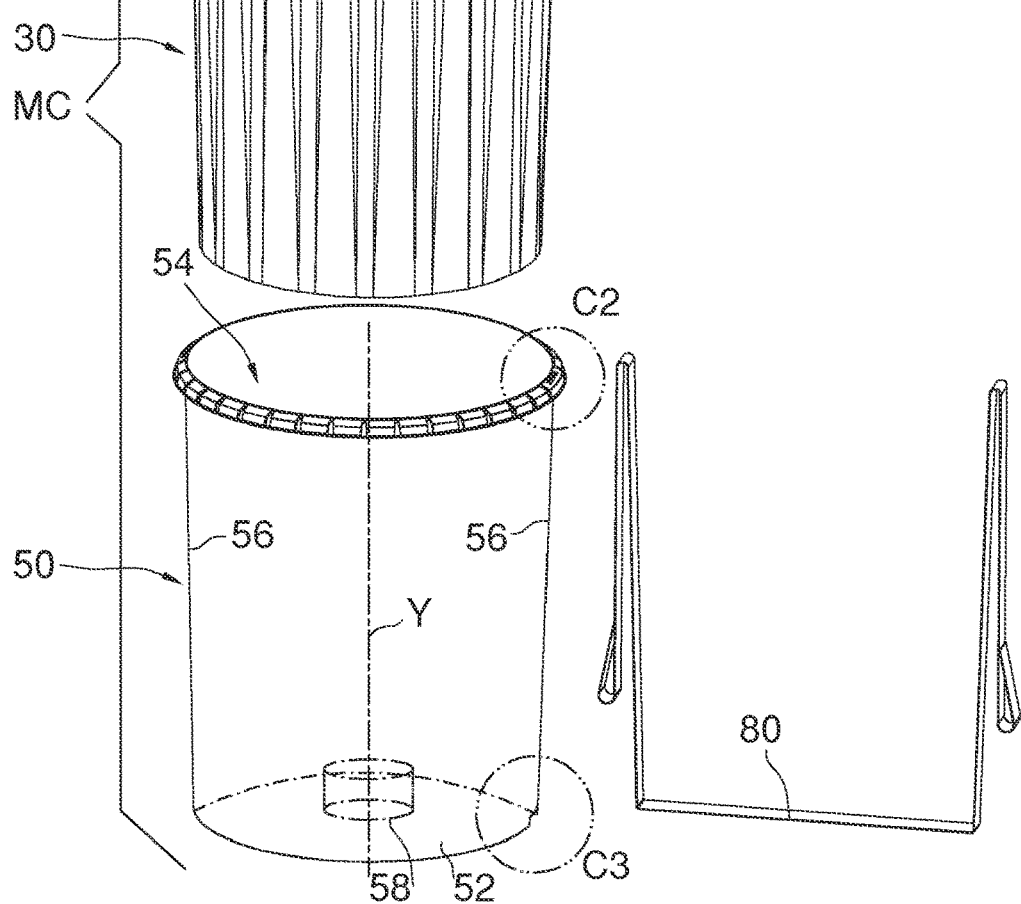
Fig. 1
Fig. 2

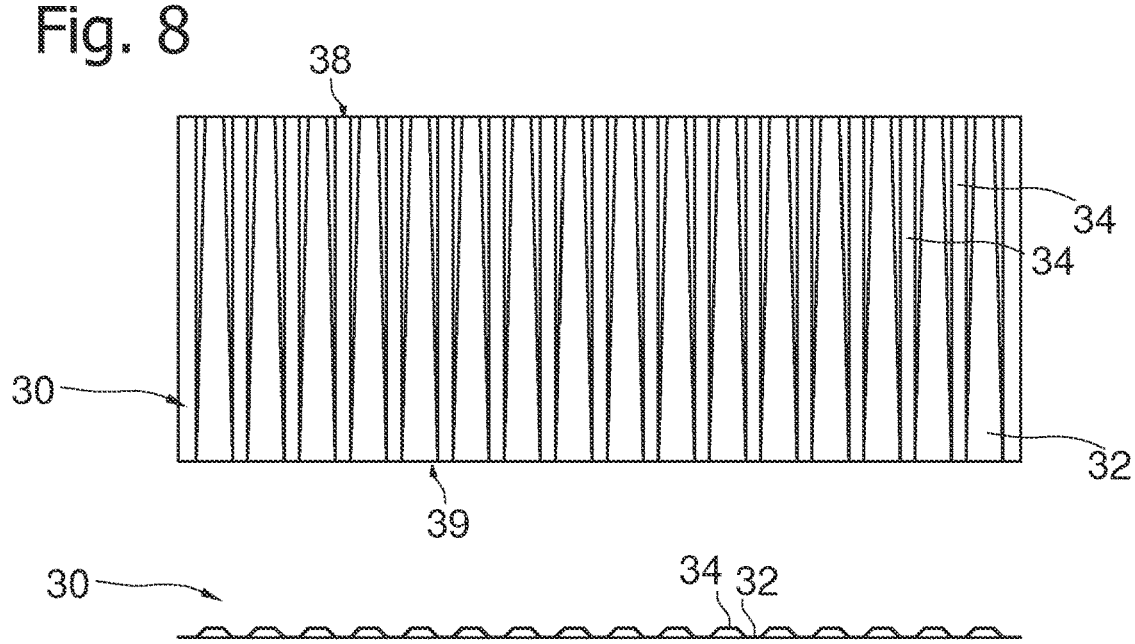
Fig. 8
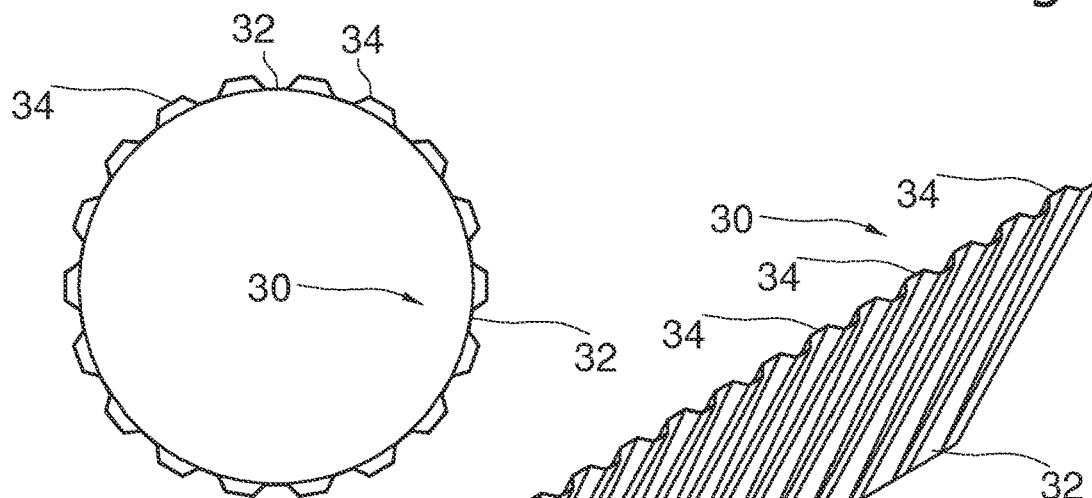
Fig. 7
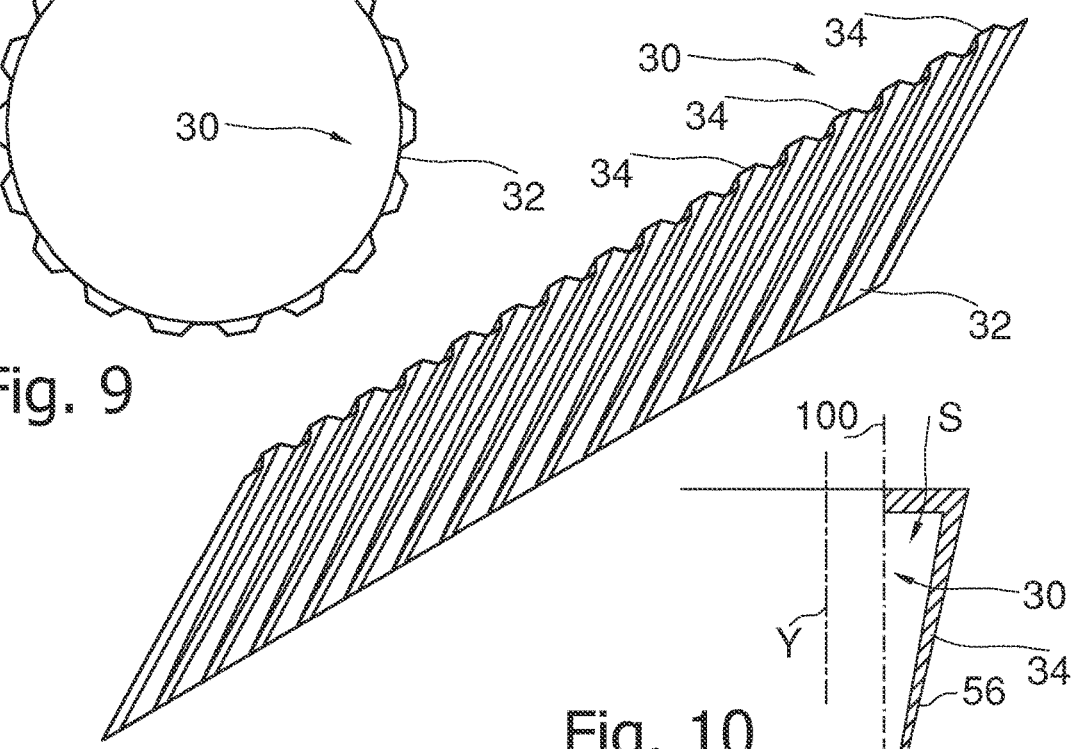
Fig. 9
Fig. 6
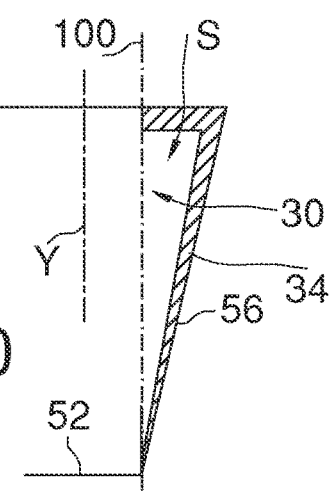
Fig. 10

DRUM FOR WELDING WIRE

TECHNICAL FIELD

The present invention relates to a drum for welding wire.

BACKGROUND

It is known that spires of welding wire (coils), from 250 to 500 kg, are packaged and transported in cardboard (kraft) drums, see e.g. AT7680U1 and EP0519424B1. The drums are cylindrical or parallelepipeds and closed by a lid.

The big problem with these drums is the transport and storage in the warehouse. Given their low weight-to-volume ratio, transport costs are very high and the storage complicated. Furthermore, the drums are not very resistant mechanically, and therefore hardly reusable, they cannot tolerate water and humidity, and are not airtight.

SUMMARY

The main object of the invention is to make a drum that mitigates or completely eliminates the above drawbacks.

A drum is then proposed for containing a coil of welding wire, comprising
- a container having a bottom and side walls for delimiting a cavity for housing the coil,
- a lid to close the container,
- wherein the container is a tapered-shape shell (e.g. a truncated cone or pyramid),
- and the smaller base of the container corresponds to the bottom of the container.

Thanks to the tapered or truncated cone or truncated pyramid shape various containers can be stack one on top of the other by inserting the bottom of one into the cavity of another. Therefore the transport volume is utilized much better.

In order to produce resistant drums, the shell is preferably made of plastic material, e.g. polypropylene or PVC.

In order to mass produce the drums quickly and at low cost, preferably the shell is made by injection molding.

Preferably the center of the smaller base of the container integrally comprises an element in relief, useful for centering the coil and easily produced by injection molding at the same time as the shell. In particular, the element in relief is a ring or disk.

Preferably, the drum comprises a diametrical groove that runs outside the base of the container, useful for receiving a lifting strap for the drum.

Preferably the container has an edge that delimits the opening closed by the lid, and the edge comprises an eyelet for the passage of the lifting belt for the drum.

In particular, in the eyelet there is a flexible element to clamp the belt on the edge of the container.

Preferably, the lid comprises an eyelet for the passage of the lifting belt for the drum, so as to exploit the strap to keep the lid fixed on the container.

Preferably the center of the base of the container integrally comprises an element in relief, useful for centering the coil and easily produced by injection molding at the same time as the shell. In particular, the element in relief is a ring or disk.

Preferably, the container comprises in one piece the diametrical groove and/or the edge of the container and/or the eyelet and/or the flexible element. This construction is achieved easily if advantageously the container is molded by injection into a mold with plastic material.

A possible problem of a tapered drum is the instability of the coil contained in it and the unwinding of the wire. When the wire unwinds inside a tapered container it may happen some spires get stuck or twisted together, compromising the unwinding of the wire. An optimal unwinding of a coil should envisage that the internal diameter of the container remains constant. By a geometric factor, the residual space between the coil and the internal walls of the container, and therefore the internal diameter of the container in which the wire is wound, decreases from the top to the base. To solve this problem, preferably the drum comprises a filling element shaped to extend into the space between the internal surface of the container and the lateral surface of an imaginary cylinder having a base substantially equal to the (greater) one of the container (or of said truncated cone or pyramid). In this way the coil "sees" a cylindrical drum.

The filling element may be rigid (i.e. capable of maintaining a constant shape) or flexible, to transport it folded or unfolded.

The filler element may completely fill said space, or partially to save material and make it lighter.

The filling element may have various embodiments.

The filling element in a variant comprises a cylindrical surface from which projecting portions, configured to occupy the distance between the inner surface of the container and the lateral surface of the imaginary cylinder, radially extend, wherein the maximum projection of the protruding portions (i.e. the radial length between a base of the protruding portion on the cylindrical surface and the point of the portion farthest away from the cylindrical surface) decreases—e.g. linearly—along the axis of the cylindrical surface.

The protruding portions are e.g. configured as pins, fingers, wings, bubbles, points, curls, spirals, or any other volume.

It is very convenient to be able to produce the filling element in an economical and fast way.

A preferred embodiment then envisages that the filling element comprises or consists of a (e.g. plastic) sheet having corrugations or said protruding portions spread over a surface, so that by folding the sheet to form a cylinder said cylindrical surface is obtained from which said protruding portions radially extend.

In particular, in the sheet the corrugations or said protruding portions comprise or are constituted of folds of the sheet. Preferably the folds of the sheet form a plurality of raised (e.g. fretted) ribs all extending parallel to each other from one edge of the sheet to an opposite edge all having height linearly decreasing in the same direction.

In the sheet folded like a cylinder, the ribs become a three-dimensional circular array to occupy said space.

Preferably, the plurality of ribs is made on a plastic sheet by means of thermoforming, which allows high production volumes and low cost.

The filling element in another variant comprises a wedge-shaped and/or tapered element placed inside the container, wherein the filling element has two ends and one end has smaller cross-section than the other end. The filling element is placed inside the container so that its smaller cross-section end is the one closest to the base of the container.

In particular, the drum may comprise a plurality of wedge-shaped and/or tapered filling elements as defined above, preferably arranged with polar symmetry around the center or axis of the container.

To stabilize a or each filling element inside the container, in particular the wedge-shaped and/or tapered one, preferably the drum and/or a or each filling element comprises fastening means or fastening elements for fixing the filling element to the container.

In particular, the means or elements for fastening to the container comprise a part on the filling element and a part on the internal surface of the container, the two parts being able to be fixed and/or fitted on each other through shape- or joint-coupling or interposition.

In a preferred embodiment, the fastening means or elements comprise an element, e.g. a hook or a hanger or a pin, which is protruding from the filling element and configured to cooperate by interlocking with a seat, e.g. a seat complementary to the protruding element, present on the inner surface of the container. The position of the protruding element and that of the seat may be swapped.

In another preferred embodiment, the fastening means or elements comprise a cavity obtained in the base of the container, the cavity being complementary to the end of the filling element which has smaller cross-section, the latter end being inserted into the cavity. Or the fastening means or elements comprise a cavity obtained in one (e.g. lower) end of the filling element and the inner surface of the container comprises a projection complementary to the cavity, so that the projection can be inserted into the cavity.

In another preferred embodiment, the fastening means or elements comprise adhesives or Velcro®.

Another aspect of the invention concerns a method for producing a drum as defined above. In particular, the method envisages to produce a drum to contain a coil of welding wire, wherein the drum comprises a container having a bottom and side walls to delimit a cavity to house the coil, and a lid to close the container, wherein by injection molding the container is molded as a tapered or frustoconical shell, and the base of the container corresponds to the bottom of the container.

In particular, the shell is molded in plastic material, e.g. polypropylene or PVC.

BRIEF DESCRIPTION OF THE DRAWINGS

The advantages of the invention will be further clarified by preferred embodiments described below with reference to the attached drawings, in which:

FIG. 1 shows an exploded three-dimensional view of a drum according to the invention;

FIG. 2 schematically shows in cross-section a drum according to the invention;

FIG. 6 shows a three-dimensional view of an internal component of the drum;

FIG. 7 shows the component of FIG. 6;

FIG. 8 shows the component of FIG. 3;

FIG. 9 shows the component of FIG. 3 as a folded cylinder;

FIG. 10 schematically shows in cross-section the component of FIG. 3 when folded as a cylinder and installed in the drum;

DETAILED DESCRIPTION

Figure 3:
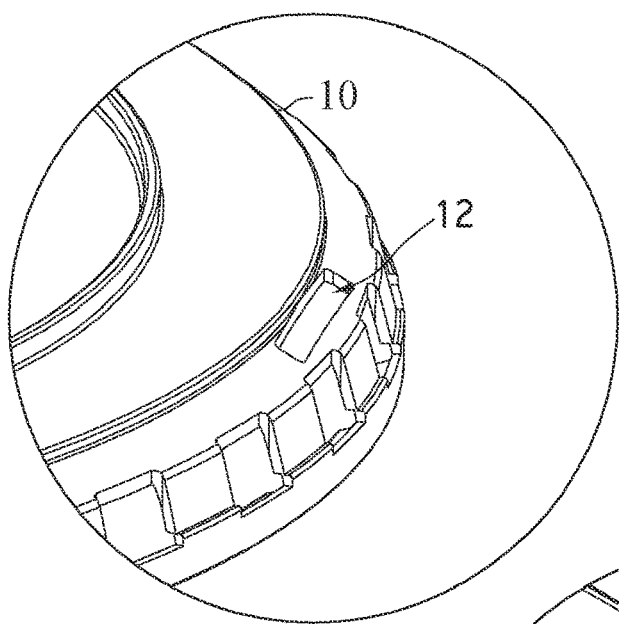
FIGS. 3-5 show enlargements of the circles C1, C2 and C3 respectively in FIG. 1.

In the figures, like references indicate identical or similar parts, and described as in use.

To avoid crowding the drawings, some elements are not indicated repeatedly.

A drum MC serves to contain a coil of welding wire (not shown).

The drum MC comprises a container 50 having a bottom 52 and side walls 56 for delimit a cavity 54 to house the coil. The cavity 56 is closable by a lid 10.

The container 50 is a shell in the shape of a truncated cone, with Y axis, which in use is tapered downwards. Hence the ease of being able to stack one drum MC inside another.

Preferably the container 50 is made of plastic material, and at the center of the bottom 52 it integrally comprises a raised ring or disc 58, useful for centering the spires or coil and/or for abutting against an optional cylinder 20 placed in the center of the container 50 to center the coil. The ring or disc 58 has a preferred height of 5 cm to 15 cm, preferably about 10 cm.

Figure 5:
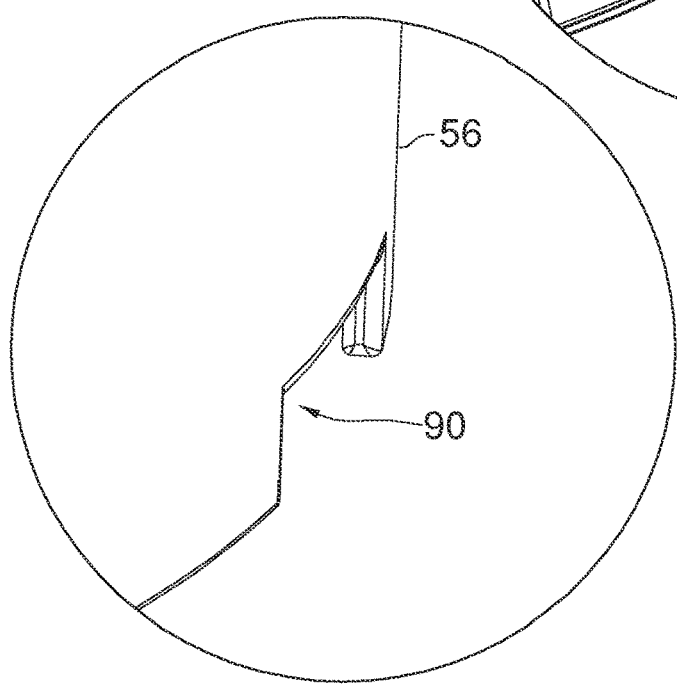

The bottom of the container 50 comprises (FIG. 5) a diametrical groove 90 which runs outside the base of the truncated cone, useful for receiving a lifting strap 80 for the drum MC.

Figure 4:
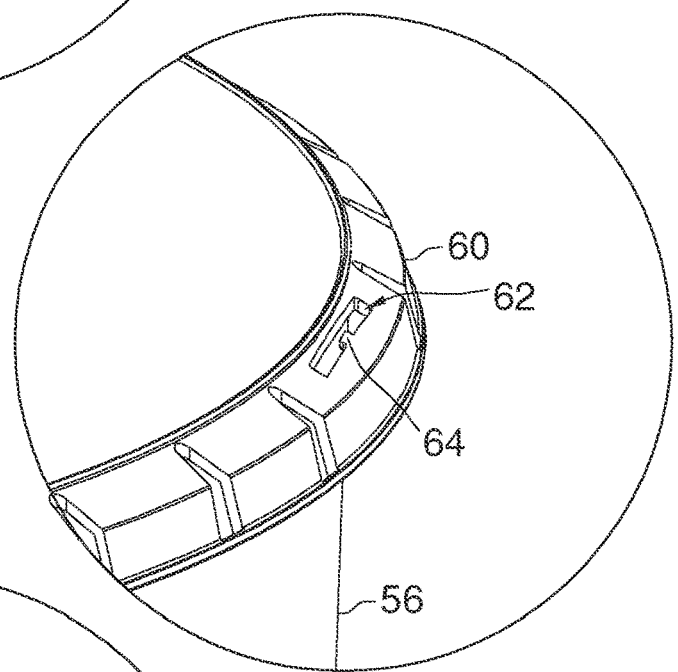

Preferably the container 50 has an edge 60 (FIG. 4) which delimits the opening closable by the lid 10, and the edge 60 comprises an eyelet 62 for the passage of the belt 80.

In particular, in the eyelet 62 there is a, e.g. flexible, tooth 64 to clamp the strap 80 on the edge 60 and keep it in place.

Preferably, the lid 10 comprises (FIG. 3) an eyelet 12 for the passage of the belt 80, so as to exploit the belt 80 also to keep the lid 10 fixed on the container 50.

To compensate for the truncated-cone shape of the drum and bring the interior thereof back to a cylindrical surface, the drum MC preferably comprises a filling element 30 (see FIGS. 1, 2, 3, 4 and 5). The filling element 30 ensures that the unwinding of the coil wire takes place with uniformity and is not affected by the fact that the distance between the coil and the inner surface of the container 50 varies with height.

The filling element 30 is shaped to extend into the space S between the inner surface of the container 50 and the lateral surface of an imaginary cylinder 100 having base substantially equal to the (greater) one of said truncated cone, see FIG. 2.

The filling element 30 preferably comprises a cylindrical surface 200 from which projecting portions 210, configured to occupy the distance between the inner surface of the container 50 and the lateral surface of the imaginary cylinder 100, extend radially (orthogonally to Y), see FIG. 2.

The maximum projection of the projecting portions 210 decreases linearly along the Y axis of the cylindrical surface 200.

The projecting portions 210 may have different embodiments, e.g. configured as rigid pins or fingers as in FIG. 2.

Another preferred embodiment envisages that the filling element 30, see FIGS. 3-8, comprises or consists of a (e.g. plastic) sheet 32 folded into a cylinder such as shown in FIG. 1.

Corrugations 34 are formed on the sheet 32 which function as the aforesaid projecting portions 210. Thus folding the sheet 32 to form a cylinder gives a cylinder from which the corrugations 34 extend radially, e.g. in all directions.

In particular, the corrugations 34 consist of folds of the sheet 32 which form a plurality of raised ribs (e.g. fretted ribs) which all extend parallel to each other from a margin 38 of sheet 32 to an opposite margin 39.

Each rib has a height that decreases linearly along Y, to adapt to the tapering of the space S towards the bottom 52.

FIG. 10 shows in an exaggerated way the variation in projection for a rib 34.

Before starting the unwinding of a coil, the cylinder-folded sheet 30 is inserted inside the container 50. The coiled wire is fenced by the sheet 30, which does not bend and stays in position thanks to the reaction of the corrugations 34 against the inner wall of the container 50.

Figure 11:
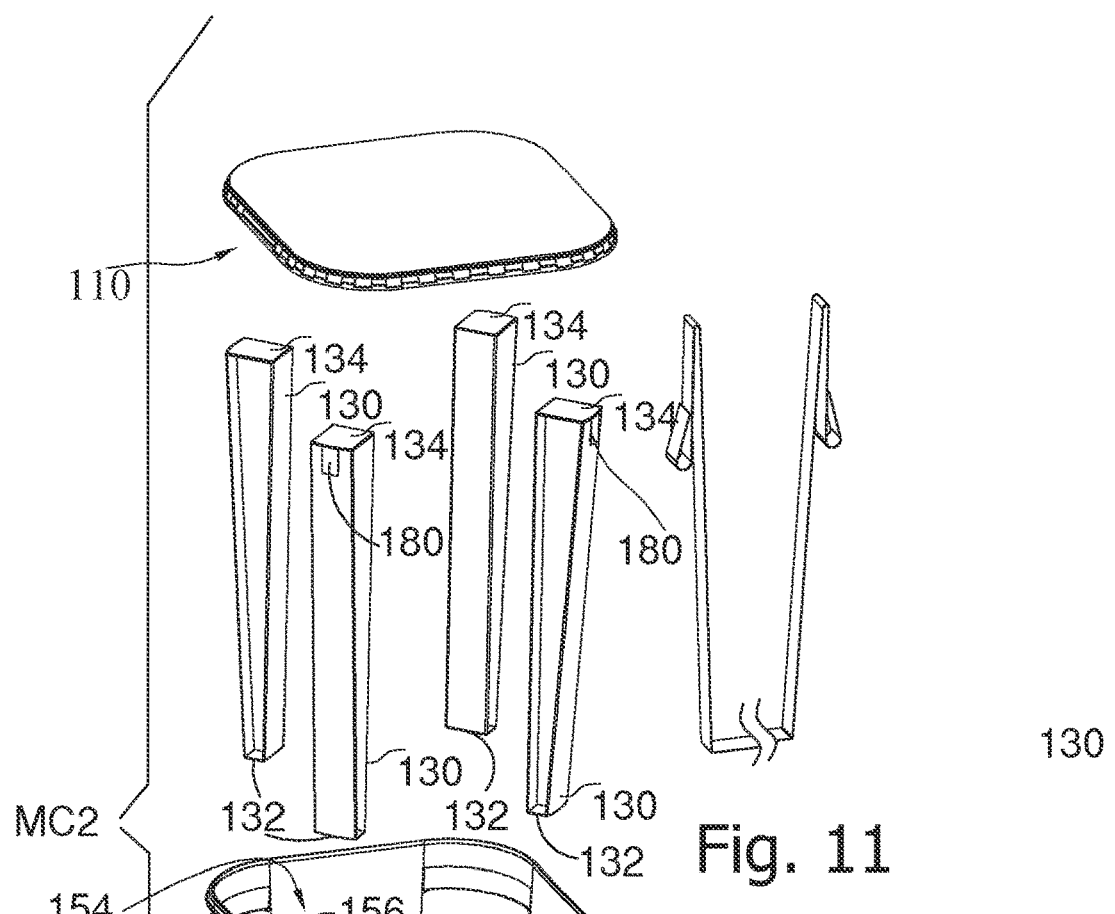
FIG. 11 shows an exploded three-dimensional view of a second drum according to the invention.
Figure 12:
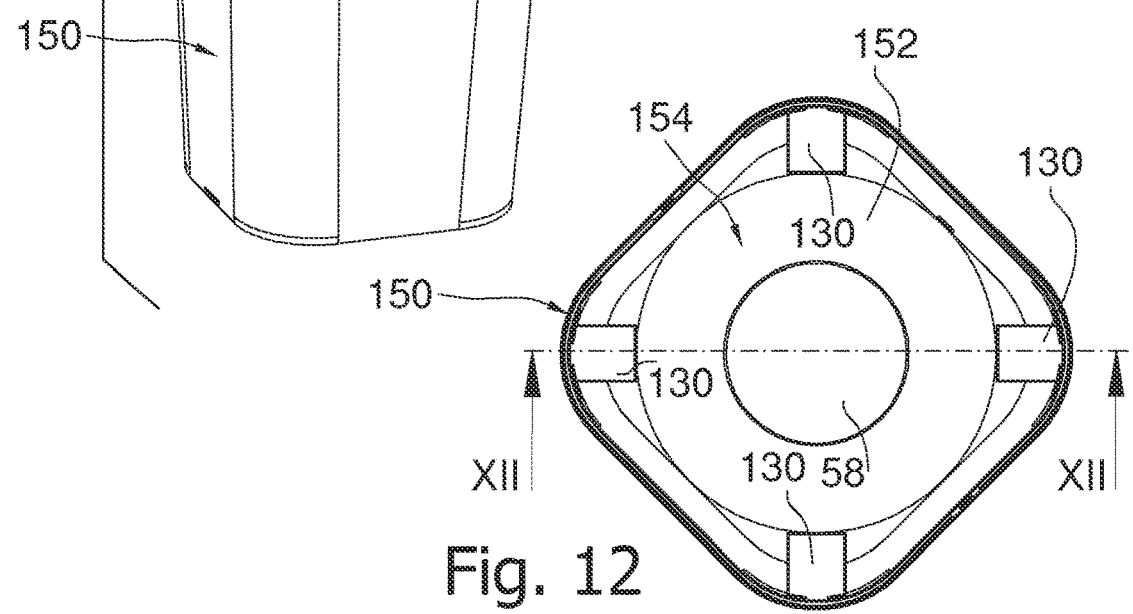
FIG. 12 shows a plan view of the drum of FIG. 11.
Figure 13:
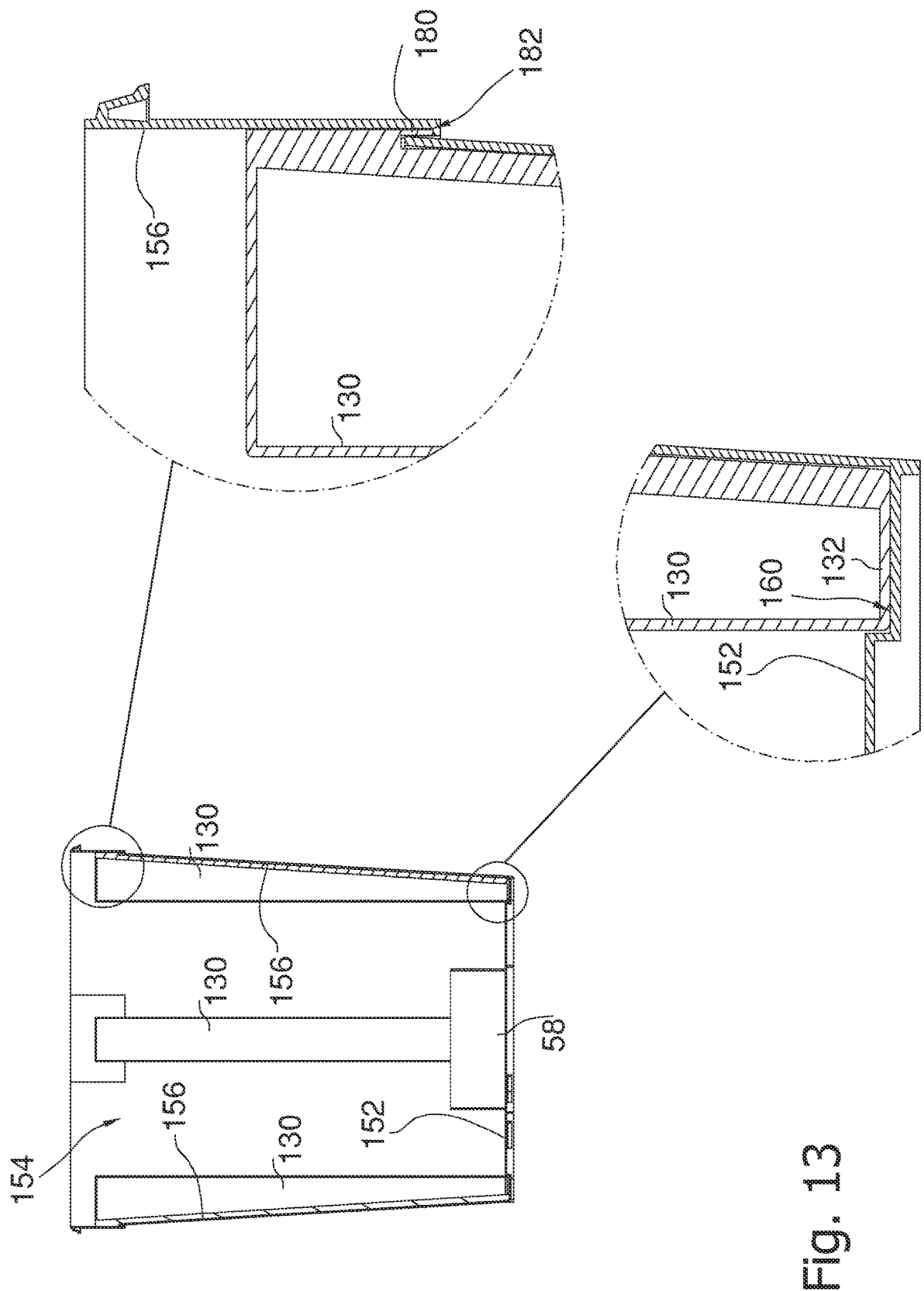
FIG. 13 shows a cross-sectional view according to the XII-XII plane of FIG. 12.

Another variant of filling element 130 is shown in conjunction with a drum MC2, see FIGS. 11-13. The drum MC2 comprises a container 150 having a bottom 152 and side walls 156 to delimit a cavity 154 for housing the coil. The cavity 156 is closable by a lid 110.

The container 150 is a tapered-shaped shell, e.g. as a truncated pyramid or cone, with Y axis, which tapers—in use—downwards.

To compensate for the tapered shape of the container 150 and bring the inside thereof back to a cylindrical surface, the drum MC2 comprises one or more filling elements 130 (see FIGS. 11-13), with the same effect as element 30.

The filling element 130 is shaped like a wedge and so as to extend into the space between the inner surface of the container 150 and the side surface of an imaginary cylinder 200 having a base substantially equal to the (greater) one of the container base 150. The filling element 130 has a shorter base 132 and a longer base 134, and is preferably a hollow shell, to limit the total weight of the drum.

Each illustrated filling element 30, 32 130 preferably comprises a protruding hook 180 that can be inserted into a pocket or edge 182 obtained on the internal surface of the respective container 50, 150, see e.g. FIG. 13. In this way the filling element 30, 32, 130 is stabilized inside the container 50, 150, preventing it from falling or moving.

Preferably to stabilize the filling element 30, 32, 130 inside the container, the inner surface of the base of the respective container 60, 150 comprises a cavity 160 complementary to the smaller base 132 of the filling element 30, 32, 130. E.g.—see FIG. 13—the shorter base 132 is placed inside a cavity 160 so that this joint makes one end of the filling element 130 immovable.

In the illustrated example, various filling elements 130 are arranged inside the container 150 with polar symmetry, e.g. according to the vertices of a regular polygon, such as a square or a triangle.

One or more filling elements 130 may generally be used for a container of any tapered shape, even e.g. for the container 50.

The invention claimed is:

1. A drum for containing a coil of welding wire, comprising:
    a container having:
        a bottom,
        side walls for delimiting a cavity in which the coil can be housed, the cavity having an internal diameter, and
        a top,
        wherein the container has a tapered shape so that said internal diameter decreases from the top to the bottom and a residual space remains between the coil and the side walls of the container;
    a lid to close the top of the container; and
    a filling element which is arranged inside the container between the coil and the side walls, shaped to extend into said residual space, which is comprised between an inner surface of the side walls of the container and a lateral surface of an imaginary cylinder having a base substantially equal to the bottom of the container, and configured to compensate for the tapered shape of the container in order for an unwinding of the coil to occur with uniformity like in a cylindrical drum and unaffected by a fact that a distance between the coil and the side walls of the container varies with height.

2. The drum according to claim 1, wherein a center of the bottom of the container integrally comprises an element in relief, the element in relief being selected from the group consisting of a ring and a disc.

3. The drum according to claim 1, comprising a diametrical groove which runs outside the bottom.

4. The drum according to claim 1, wherein the top of the container has an edge which delimits an opening closed by the lid, and the edge comprises an eyelet for a passage of a lifting belt for the drum.

5. The drum according to claim 4, wherein the eyelet has a flexible element for clamping the belt on or against the edge of the container.

6. The drum according to claim 1, wherein the filling element comprises a cylindrical surface from which protruding portions, configured to occupy a distance between the side walls of the container and the lateral surface of the imaginary cylinder, radially extend, wherein the maximum projection of the protruding portions decreases along the axis of the cylindrical surface toward the bottom of the container.

7. The drum according to claim 1, wherein the filling element comprises or consists of a sheet having corrugations distributed on a surface, so that, by folding the sheet to form a cylinder, a cylindrical surface is obtained from which said protruding portions radially extend.

8. The drum according to claim 7, wherein in the sheet the corrugations or said protruding portions comprise or consist of folds of the sheet.

9. The drum according to claim 1, wherein the filling element comprises a wedge-shaped and/or tapered element placed inside the container, wherein the filling element has two ends and one end has a smaller cross-section than the other end, the filling element being placed inside the container so that the end with smaller cross-section is the closest one to the base of the container.

10. The drum according to claim 1, wherein
    the container has a center or axis, and
    a plurality of the wedge-shaped and/or tapered filling elements are arranged with polar symmetry around said center or axis.

11. The drum according to claim 1, wherein the drum and/or each filling element comprises fastening means or elements for fixing the filling element to the container.

12. The drum according to claim 11, wherein the fastening means or elements for fastening to the container comprise a part on the filling element and a part on the inner surface of the container, the two parts being able to be fixed and/or fitted with each other through shape-coupling.

13. The drum according to claim 12, wherein the fastening means or elements for fastening to the container comprise an element, like a hook or a hanger or a pin, which is protruding from the filling element and configured to cooperate by interlocking with a seat, being complementary to the protruding element, present on the inner surface the container.

14. The drum according to claim 11, wherein the fastening means or elements for fastening to the container comprise a cavity obtained in the bottom of the container, the cavity being complementary to an end of the filling element, said end of the filling element having a smaller cross-section and being inserted into the cavity obtained in the bottom.

15. The drum according to claim 1, where the container has the shape of a truncated cone or a truncated pyramid.

16. The drum according to claim 6, wherein the filling element comprises or consists of a sheet having corrugations distributed on a surface, so that by folding the sheet to form a cylinder said cylindrical surface is obtained from which said protruding portions radially extend.

17. The drum according to claim 11, wherein the fastening means or elements for fastening to the container comprise an element, like a hook or a hanger or a pin, which is protruding from the filling element and configured to cooperate by interlocking with a seat, being complementary to the protruding element, present on the inner surface the container.

* * * * *